United States Patent
Nielsen et al.

(10) Patent No.: US 8,194,932 B2
(45) Date of Patent: Jun. 5, 2012

(54) TICKET APPROVAL SYSTEM FOR AND METHOD OF PERFORMING QUALITY CONTROL IN FIELD SERVICE APPLICATIONS

(75) Inventors: Steven E. Nielsen, North Palm Beach, FL (US); Curtis Chambers, Palm Beach Gardens, FL (US); David Pennington, Juno Beach, FL (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 522 days.

(21) Appl. No.: 12/432,870

(22) Filed: Apr. 30, 2009

(65) Prior Publication Data

US 2009/0210297 A1 Aug. 20, 2009

Related U.S. Application Data

(63) Continuation of application No. 12/204,454, filed on Sep. 4, 2008, and a continuation-in-part of application No. 12/029,732, filed on Feb. 12, 2008.

(60) Provisional application No. 61/076,253, filed on Jun. 27, 2008.

(51) Int. Cl.
*G06K 9/00* (2006.01)

(52) U.S. Cl. ...................................... 382/109; 705/7.41

(58) Field of Classification Search .................. 705/7.41; 382/109; 345/619; 702/5
See application file for complete search history.

(56) References Cited

U.S. PATENT DOCUMENTS

| 4,550,376 | A | 10/1985 | Maciejczak |
| 5,486,067 | A | 1/1996 | Huynh |
| 5,918,565 | A | 7/1999 | Casas |
| 6,074,693 | A | 6/2000 | Manning |
| 6,138,906 | A | 10/2000 | DeMayo |
| 6,169,517 | B1 | 1/2001 | Eslambolchi |
| 6,578,005 | B1 | 6/2003 | Lesaint et al. |

(Continued)

FOREIGN PATENT DOCUMENTS

CA 2386200 4/2000

(Continued)

OTHER PUBLICATIONS

International Search Report and Written Opinion, Application Serial No. PCT/2009/05443, Apr. 5, 2010.

(Continued)

*Primary Examiner* — Tom Y Lu
(74) *Attorney, Agent, or Firm* — Foley & Lardner LLP; Joseph Teja, Jr.

(57) ABSTRACT

Methods and apparatus for assessing a locate and marking operation. Ticket information is received as provided to a first locate technician prior to performing the operation. A locate manifest is received including a digital marked-up image of a geographic area surrounding a dig area in which the operation was performed, on which image at least one digital representation of at least one locate mark is electronically overlaid. The locate manifest, at least some of the ticket information, and a plurality of icons representing different possible quality assessments of the locate and marking operation are displayed. The plurality of icons includes an approved icon representing a satisfactory locate and marking operation, a QC icon representing an unsatisfactory locate and marking operation, and a coach icon representing that the first locate technician requires coaching. One of the displayed icons is selected so as to provide a quality assessment of the locate and marking operation.

30 Claims, 10 Drawing Sheets

U.S. PATENT DOCUMENTS

| | | |
|---|---|---|
| 6,601,017 B1 | 7/2003 | Kennedy et al. |
| 6,751,553 B2 | 6/2004 | Young |
| 6,751,554 B1 * | 6/2004 | Asher et al. ............... 702/5 |
| 6,938,048 B1 * | 8/2005 | Jilk et al. ............... 705/7.14 |
| 6,949,052 B2 | 9/2005 | Millington et al. |
| 6,958,690 B1 | 10/2005 | Asher et al. |
| 6,996,210 B2 | 2/2006 | Esty et al. |
| 7,003,443 B2 | 2/2006 | Ford et al. |
| 7,079,990 B2 * | 7/2006 | Haller et al. ............... 703/2 |
| 7,313,759 B2 | 12/2007 | Sinisi |
| 7,324,905 B2 | 1/2008 | Droubie et al. |
| 7,372,247 B1 | 5/2008 | Giusti et al. |
| 7,398,184 B1 | 7/2008 | Chen |
| 7,469,247 B2 | 12/2008 | Cossins et al. |
| 7,626,496 B1 | 12/2009 | Asher |
| 7,640,105 B2 | 12/2009 | Nielsen et al. |
| 7,773,095 B1 * | 8/2010 | Badrak et al. ............... 345/619 |
| 2003/0130820 A1 | 7/2003 | Lane, III |
| 2003/0168834 A1 | 9/2003 | Ulrich |
| 2003/0212621 A1 | 11/2003 | Poulter |
| 2004/0236620 A1 | 11/2004 | Chauhan et al. |
| 2005/0033620 A1 | 2/2005 | Gloor et al. |
| 2005/0057745 A1 | 3/2005 | Bontje |
| 2005/0232475 A1 | 10/2005 | Floeder |
| 2006/0077095 A1 | 4/2006 | Tucker et al. |
| 2006/0085133 A1 | 4/2006 | Young et al. |
| 2006/0085396 A1 * | 4/2006 | Evans et al. ............... 707/3 |
| 2006/0206370 A1 | 9/2006 | Skopal |
| 2006/0282280 A1 | 12/2006 | Stotz et al. |
| 2007/0127694 A1 | 6/2007 | Hajj et al. |
| 2007/0219722 A1 | 9/2007 | Sawyer et al. |
| 2007/0288159 A1 | 12/2007 | Skelton |
| 2008/0001009 A1 | 1/2008 | Young |
| 2008/0245299 A1 | 10/2008 | Nielsen et al. |
| 2009/0013928 A1 | 1/2009 | Nielsen et al. |
| 2009/0157746 A1 | 6/2009 | More et al. |
| 2009/0184823 A1 | 7/2009 | Tessier |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0265430 A1 | 10/2009 | Bechtel |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0034483 A1 | 2/2010 | Giuffrida |
| 2010/0084532 A1 | 4/2010 | Nielsen et al. |
| 2010/0085054 A1 | 4/2010 | Nielsen et al. |
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0146454 A1 | 6/2010 | Sugahara |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256863 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |

| | | | |
|---|---|---|---|
| 2012/0036140 | A1 | 2/2012 | Nielsen et al. |
| 2012/0065924 | A1 | 3/2012 | Nielsen et al. |
| 2012/0065944 | A1 | 3/2012 | Nielsen et al. |
| 2012/0066137 | A1 | 3/2012 | Nielsen et al. |
| 2012/0066273 | A1 | 3/2012 | Nielsen et al. |
| 2012/0066506 | A1 | 3/2012 | Nielsen et al. |
| 2012/0069178 | A1 | 3/2012 | Nielsen et al. |
| 2012/0072035 | A1 | 3/2012 | Nielsen et al. |

FOREIGN PATENT DOCUMENTS

| | | |
|---|---|---|
| JP | 2005327228 A | 11/2005 |
| JP | 2006189930 A | 7/2006 |
| WO | WO9516827 | 6/1995 |
| WO | WO0228541 | 4/2002 |

OTHER PUBLICATIONS

International Search Report and Written Opinion, Application Serial No. PCT/2009/05416, Jun. 7, 2010, 11 pages.
U.S. Appl. No. 12/364,339, filed Feb. 2, 2009, Nielsen et al.
U.S. Appl. No. 12/571,356, filed Sep. 30, 2009, Nielsen et al.
U.S. Appl. No. 12/572,202, filed Oct. 1, 2009, Nielsen et al.
U.S. Appl. No. 12/572,260, filed Oct. 1, 2009, Nielsen et al.
U.S. Appl. No. 12/704,485, filed Feb. 11, 2010, Nielsen et al.
U.S. Appl. No. 12/833,103, filed Jul. 9, 2010, Nielsen et al.
U.S. Appl. No. 12/833,117, filed Jul. 9, 2010, Nielsen et al.
U.S. Appl. No. 12/833,121, filed Jul. 9, 2010, Nielsen et al.
U.S. Appl. No. 12/833,127, filed Jul. 9, 2010, Nielsen et al.
U.S. Appl. No. 12/850,187, filed Aug. 4, 2010, Nielsen et al.
U.S. Appl. No. 12/850,712, filed Aug. 5, 2010, Nielsen et al.
International Search Report and Written Opinion, Application Serial No. PCT/US2009/03810, Aug. 17, 2010.
Office Action dated Apr. 28, 2011 from U.S. Appl. No. 12/204,454.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, pp. 8-11, 79-85.
Co-Pending U.S. Appl. No. 12/204,454, filed Sep. 4, 2008.
Co-Pending U.S. Appl. No. 12/432,849, filed Apr. 20, 2009.
Co-Pending U.S. Appl. No. 12/432,860, filed Apr. 30, 2009.
Co-Pending U.S. Appl. No. 12/432,878, filed Apr. 30, 2009.
Co-Pending U.S. Appl. No. 12/432,909, filed Apr. 30, 2009.
Co-Pending U.S. Appl. No. 12/364,339, filed Feb. 2, 2009.
Co-Pending U.S. Appl. No. 12/493,109, filed Jun. 26, 2009.
Co-Pending U.S. Appl. No. 12/537,732, filed Aug. 7, 2009.
Co-Pending U.S. Appl. No. 12/537,856, filed Aug. 7, 2009.
Co-Pending U.S. Appl. No. 12/537,894, filed Aug. 7, 2009.
Co-Pending U.S. Appl. No. 12/537,917, filed Aug. 7, 2009.
CGA, Common Ground Alliance, Best Practices, Version 1.0, Apr. 2003.
CGA, Common Ground, Study of One-Call Systems and Damage Prevention Best Practices, Aug. 1999.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Fial.pdf.
Charlton, B.G. et al., "Auditing as a tool of public policy—The misuse of quality assurance techniques in the UK university expansion," Final draft of a paper published in European Political Science 2002; 2: 24-35.
GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the FLAME—Utility Integrates Field Applications," GeoWorld, Mar. 2007, 5 pages, online: Systems Integration Articles/Enspiria Solutions.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Oct. 11, 2011 from Canadian Application No. 2,691,780.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Nov. 21, 2011 from U.S. Appl. No. 12/204,454.
Office Action dated Dec. 7, 2011 from U.S. Appl. No. 12/537,856.
Office Action dated Dec. 9, 2011 from U.S. Appl. No. 12/493,109.
Office Action dated Dec. 12, 2011 from U.S. Appl. No. 12/537,917.
Office Action dated Dec. 13, 2011 from U.S. Appl. No. 12/537,894.
Office Action dated Dec. 19, 2011 from U.S. Appl. No. 12/571,356.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Whiting, P., "No role for quality scores in systematic reviews of diagnostic accuracy studies," BMC Medical Research Methodology, 2005, 5:19, 9 pages.
U.S. Appl. No. 12/571,408, filed Sep. 30, 2009, Nielsen et al.
Office Action dated Feb. 14, 2012 from U.S. Appl. No. 12/833,103.
Office Action dated Feb. 29, 2012 from U.S. Appl. No. 12/704,485.
Office Action dated Feb. 29, 2012 from U.S. Appl. No. 12/833,117.
Office Action dated Feb. 29, 2012 from U.S. Appl. No. 12/833,127.
Office Action dated Mar. 1, 2012 from U.S. Appl. No. 12/833,121.
Office Action dated Mar. 19, 2012 from U.S. Appl. No. 12/204,454.
Office Action dated Apr. 4, 2012 from U.S. Appl. No. 12/572,202.

* cited by examiner

Approver Inbox GUI
300

| SUPERVISOR: Pennington, David (23400) | | |
|---|---|---|
| DATE: 3/25/08 | 🖽 New Tickets: | 142 |
| TICKET TOTAL: 146 | Q Quality Controlled Tickets: | 3 |
| IMAGE TOTAL: 146 | ⊛ Coached Tickets: | 1 |

LOCATE TECHNICIAN: *310a*
Narissi, Joseph
(100234, Crew# 23400)
Tickets:
🖽 22  Q 1  ⊛ 1
   312  314  316

LOCATE TECHNICIAN: *310b*
Block, Greg
(100235, Crew# 23400)
Tickets:
🖽 16  Q 0  ⊛ 0

LOCATE TECHNICIAN: *310c*
Brown, Chris
(100236, Crew# 23400)
Tickets:
🖽 0  Q 0  ⊛ 0

LOCATE TECHNICIAN *310d*
Wetzel, David
(100237, Crew# 23400)
Tickets:
🖽 13  Q 2  ⊛ 0

LOCATE TECHNICIAN: *310e*
Steffen, Michael
(100238, Crew# 23400)
Tickets:
🖽 18  Q 0  ⊛ 0

LOCATE TECHNICIAN: *310f*
Phillips, Mark
(100239, Crew# 23400)
Tickets:
🖽 10  Q 0  ⊛ 0

LOCATE TECHNICIAN: *310g*
Grossman, Leslie
(100240, Crew# 23400)
Tickets:
🖽 26  Q 0  ⊛ 0

LOCATE TECHNICIAN: *310h*
Benlice, Victor
(100241, Crew# 23400)
Tickets:
🖽 21  Q 0  ⊛ 0

LOCATE TECHNICIAN: *310i*
Truitt, Jeremy
(100242, Crew# 23400)
Tickets:
🖽 16  Q 0  ⊛ 0

QC Approver Inbox GUI
600

| QUALITY CONTROL SUPERVISOR: Smith, Mary (23455) |

DATE: 3/25/08
TICKET TOTAL: 3
IMAGE TOTAL: 3

LOCATE TECHNICIAN: *610a*
Narissi, Joseph
(100234, Crew# 23400)
TICKET:
7808238
REFERRAL COUNT:
0

LOCATE TECHNICIAN: *610b*
Wetzel, David
(100237, Crew# 23400)
TICKET:
7808322
REFERRAL COUNT:
0

LOCATE TECHNICIAN: *610c*
Wetzel, David
(100237, Crew# 23400)
TICKET:
7808349
REFERRAL COUNT:
0

*FIG. 6*

Manager Summary GUI
*1100*

Manager: Chambers, Curtis (33001)

Random Samples to Approve
Pending Approvals

Pennington, David (Crew #23400)  🔍 9  📄 142  Ⓠ 3  💰 1

Farr, Jeff (Crew #234001)  🔍 12  📄 168  Ⓠ 5  💰 0

Smith, John (Crew #23402)  🔍 10  📄 151  Ⓠ 1  💰 0

Doe, Mary (Crew #23403)  🔍 9  📄 134  Ⓠ 1  💰 2
　　　　　　　　*312*　　*314*　*316*

*FIG. 11*

TICKET APPROVAL SYSTEM FOR AND METHOD OF PERFORMING QUALITY CONTROL IN FIELD SERVICE APPLICATIONS

CROSS-REFERENCE TO RELATED APPLICATIONS

This application claims the benefit, under 35 U.S.C. §120, as a continuation of U.S. non-provisional patent application Ser. No. 12/204,454, filed on Sep. 4, 2008, entitled "Ticket Approval System for and Method of Performing Quality Control in Field Service Applications." Ser. No. 12/204,454 in turn claims the benefit, under 35 U.S.C. §119(e), of U.S. provisional application Ser. No. 61/076,253, filed in the U.S. Patent and Trademark Office on Jun. 27, 2008, having the same title.

Ser. No. 12/204,454 also claims the benefit, under 35 U.S.C. §120, a continuation-in-part (CIP) of U.S. non-provisional application Ser. No. 12/029,732, filed on Feb. 12, 2008, entitled "Electronic Manifest of Underground Facility Locate Marks."

Each of the above-identified applications is incorporated herein by reference in its entirety.

BACKGROUND

1. Technical Field

The present disclosure generally relates to quality control in field service applications. In particular, the present disclosure is directed to a work order approval system and method of performing quality control in field service applications, such as locate operations.

2. Description of the Related Art

Field service applications may be any application in which companies dispatch technicians and/or other staff into the field in order to perform, for example, certain installations, services, and/or repairs. Field service applications may exist in industries, such as, but not limited to, network installations, utility installations, security systems, construction, medical equipment, heating, ventilating, and air conditioning (HVAC), and the like.

In certain field service applications, there may be an associated work order for each field call. These work orders are hereafter referred to as tickets. The ticket information may include, for example, the physical address or other location information to which the field technician is dispatched, the type of installation service, and/or repair that is requested. Depending on the field service application, certain processes may exist for verifying certain aspects of the installations, services, and/or repairs that are to be performed by the field service technicians according to the ticket information. Since there may be numerous field technicians, each of whom are assigned numerous tickets, implementing and performing meaningful oversight and quality control activities in a timely fashion may be difficult. As a result of the limited quality control activities in certain field service applications, customer satisfaction may be adversely affected. Additionally, the time, effort, and cost that is associated with re-performing work in the field or with correcting and/or improving poorly performed field calls may be unacceptable.

Consequently, a need exists for methods of providing oversight and quality control in field service applications in order to improve customer satisfaction, to identify and reduce the number of poorly performed tickets, and to improve visibility into distributed workforce operations. More specifically, a need exists for improved approaches to quality control in the underground facility locate industry in order to improve customer satisfaction and to reduce the risk of damage to underground facilities due to poorly performed locate operations.

SUMMARY

According to one aspect of the present disclosure, a method of performing quality control in a field service application is presented. The method includes obtaining a ticket, performing at least one task associated with the ticket, collecting data associated with at least one task, and transmitting the data to a work management server. The method further includes reviewing the data received by the approval application for quality control purposes. The work management server includes a database and an approval application.

According to another aspect of the present disclosure, a method of performing quality control in a field service application is provided. The method includes obtaining a ticket associated with a determination of a presence or an absence of at least one underground facility, and determining the presence or absence of at least one underground facility. The method further includes performing at least one task resulting from the step of determining, generating and collecting data associated with a dig area defined in the ticket, transmitting the data to a work management server, and reviewing the data received by the approval application for quality control purposes. Further, the work management server includes a database and an approval application.

According to a further aspect of the present disclosure, a system for maintaining quality control in a field service application is presented. The system includes a ticket with a work order and a dig area associated with the work order, a locate technician to determine a presence or an absence of at least one underground facility, and an image capture mechanism to obtain data associated with the ticket. The system also includes a work management server and a network to transmit the data associated with the ticket to the work management server. The work management server includes a database and a ticket approval application and the ticket approval application is a software application that provides a graphical computerized mechanism for an approver to perform a quality control review.

According to yet another aspect of the present disclosure, a system is presented. The system includes a ticket with a work order and a dig area associated with the work order. The ticket is associated with at least one task and the task includes marking for a presence or an absence of at least one underground facility. The system also includes a locate technician to perform at least one task associated with the ticket, an image capture mechanism to obtain data associated with the ticket, a work management server, and a network. The work management server includes a database and a ticket approval application. Further, the network transmits the data associated with the ticket and the performance of at least one task associated with the ticket to the work management server.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

FIG. 3 illustrates an example of an approver inbox GUI for use in the ticket approval system, in accordance with the present disclosure;

FIG. 4 illustrates an example of an approver image viewer GUI for use in the ticket approval system, in accordance with the present disclosure;

FIG. 5 illustrates an example of a QC referral popup window for use in the ticket approval system, in accordance with the present disclosure;

FIG. 6 illustrates an example of a QC approver inbox GUI for use in the ticket approval system, in accordance with the present disclosure;

FIG. 11 illustrates an example of a ticket summary GUI for use in the ticket approval system, in accordance with the present disclosure.

DETAILED DESCRIPTION

Figure 1:
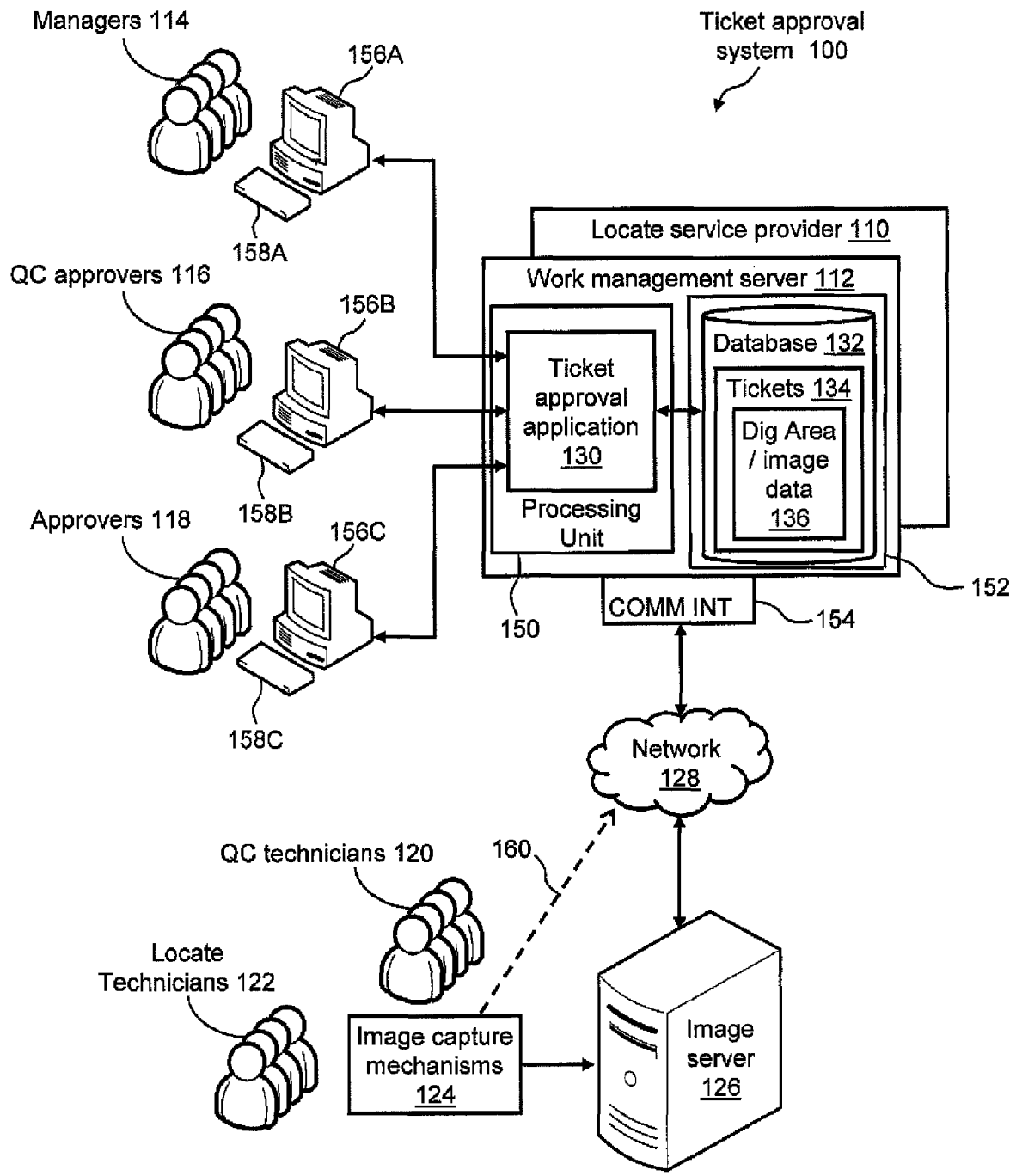
FIG. 1 illustrates a functional block diagram of an example of a ticket approval system for performing oversight and quality control, in accordance with the present disclosure.

The following detailed description refers to the accompanying drawings. The same reference numbers in different drawings may identify the same or similar elements. In addition, the following detailed description does not limit the present disclosure.

In the discussion that follows, the term "dig area" means any specified geographic area within which excavation may occur, the term "excavation" means disturbing or penetrating the ground, the term "excavation area" means the ground where excavation occurs or will occur, and the term "facility owner" means an owner, an operator, or a third party contractor that provides the services of a locate operation and/or a marking operation to a facility owner as an agent or otherwise. Examples of a facility owner may include, but are not limited to, a gas company, a water company, a sewer company, a power company, a telephone company, or a cable company. In addition, the term "image" means any image, depiction, and/or visual representation. An image may be, but is not limited to, images captured or stored in any human or machine readable format.

Further, the term "locate device" means any apparatus and/or device for detecting and/or inferring the presence or absence of any facility, including without limitation, any underground facility, the term "locate mark" means any mark, sign, and/or other means indicating the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof. The term "locate operation" means any activity to detect or infer the presence or absence of an underground facility, and the term "marking operation" means any activity to mark the presence or absence of an underground facility. In addition, the term "locate technician" means an individual performing a locate or a locate operation. The term "manifest" means any record in any form that comprises information relating to a locate or a locate operation. A manifest may include separately or in combination, and without limitation, information concerning a dig area, environmental landmarks, type and approximate geographic location of the presence or absence of at least one locate mark, time, date and duration of the locate operation, facility owner(s), party requesting a locate operation, identity of the locate technician, and/or notes of the locate technician.

The term "marking device" means any apparatus, mechanism, or other means of employing a marking dispenser for causing a marking material and/or marking object to be dispensed, and the term "marking dispenser system" means a system including, but not limited to, a marking device, a marking dispenser, and an actuator. Further, the term "marking object" means any object and/or objects used or which may be used separately or in combination to mark, signify, and/or indicate. Examples of marking objects may include, but are not limited to, a flag and/or an RFID marking ball, and the term "marking material" means any material, substance, compound, and/or element, used or which may be used separately or in combination to mark, signify, and/or indicate. Examples of marking materials may include, but are not limited to, paint, chalk, dye, and/or iron.

Additionally, the term "facility" means one or more lines, cables, fibers, conduits, transmitters, receivers, or other physical objects or structures capable of or used for carrying, transmitting, receiving, storing, and providing utilities, energy, data, substances, and/or services, and/or any combination thereof, and the term "underground facility" means any facility beneath the surface of the ground. Examples of facilities include, but are not limited to, oil, gas, water, sewer, power, telephone, data transmission, cable TV, and/or internet services.

The present disclosure includes a method and system of performing oversight and quality control in field service applications, such as locate operations, and ticket approval systems. The ticket approval system of the present disclosure provides a mechanism by which approvers and/or managers may review the quality of locate operations in real time and/or within a certain amount of time (e.g., within one day) of the locate operation. In particular, a ticket approval software application of the present disclosure provides a graphical computerized mechanism for viewing the information, such as images, that is associated with locate operations, which allows for a rapid and efficient processing of tickets. Examples of images include, but are not limited to, digital images, aerial images, and so on. In doing so, approvers and/or managers may assess the quality of each locate operation in a time efficient manner. Based on the assessment, locate operations may be categorized in a variety of ways, for example: (1) approved, no further action needed; (2) satisfactory, but the locate technician needs coaching or training; or (3) unsatisfactory, the ticket needs quality control (QC) action. While approvers may be required to assess all tickets of the locate technicians under their supervision, a random subset of tickets may be selected for higher managerial review, adding a further level of quality assurance.

The ticket approval system of the present disclosure maintains a numerical count of approved tickets, coaching referrals, and QC referrals. In the case of QC referrals, the ticket may require immediate dispatch to the original locate technician or a QC technician. QC referrals may be considered high priority and, therefore, routed to the next available time slot of the locate or QC technician, in order to correct defects in a timely manner.

The method and system of the present disclosure may be used in a locate operation. Man-made objects, such as facilities, and in particular, underground facilities (e.g., gas, water, sewer, power, telephone, and cable television lines), are susceptible to damage from various things, such as from excavation. Local and federal laws may require that notification be given to facility owners that own underground facilities in an excavation area before any excavation takes place. If such notification is received, the facility owner typically locates and marks the location of the underground facilities. By way of example, the facility owner may use a ticket approval system for and method of performing oversight and quality control during a locate operation, as described herein.

Locate operations may be performed, for example, by the facility owner. A marking dispenser system is typically used to create locate marks. Paint is commonly used as the marking material, and it is typically applied using a marking device. The color of the marking material is typically chosen based on the type of underground facility that is being marked (e.g., red paint for a power line).

Protocols may exist for verifying certain aspects of locate operations that are performed by locate technicians. For example, for each locate operation, the locate technician may be required to provide certain evidence (e.g., photographs) that may be used in order to verify (against the original ticket) the actual address at which the locate operation was performed versus the requested address, the actual locate operations that were performed versus the requested locate operations, and to provide proof that the locate operation was actually performed (i.e., proof of "locate marks").

The system of the present disclosure provides a mechanism by which approvers and/or managers may review the quality of locate operations in real time and/or within a certain amount of time (e.g., within one day). In particular, a ticket approval software application of the present disclosure provides a graphical computerized mechanism for viewing the information, for example, digital information, markings, and images, that is associated with the locate operations, which allows rapid and efficient processing of tickets.

Further, approvers and/or managers may quickly assess the quality of each locate operation. Based on the assessment, locate operations may be categorized as, for example, (1) approved, no further action needed, (2) satisfactory, but the locate technician needs coaching or training, or (3) unsatisfactory, the ticket needs quality control (QC) action. While approvers may be required to assess all tickets of the locate technician under their supervision, a random and/or rules-based subset of tickets may be selected for higher managerial review, adding a further level of oversight and quality assurance.

The ticket approval system of the present disclosure maintains, for example, a numerical count of approved tickets, coaching referrals and QC referrals. In the case of QC referrals, the ticket may require immediate dispatch to the original locate technician or a QC technician. QC referrals may be considered high priority and, therefore, routed to the next available time slot of the locate technician or QC technician in order to correct any defects prior to the start of excavation.

Referring to FIG. 1, a functional block diagram of a system 100 for performing oversight and quality control in locate operations is provided. System 100 may include a locate service provider 110, which may be any facility owner. Additionally, system 100 may include a work management server 112, which is maintained and operated by locate service provider 110, and which may be any local or centralized computing device, including a processing unit 150, a memory 152, and a communication interface 154, that is capable of hosting an application such as a ticket approval application 130, as discussed further below. In implementation, work management server 112 may be a networked application and/or web server.

Personnel that are associated with system 100 may include, but are not limited to, managers 114, QC approvers 116, approvers 118, QC technicians 120, and locate technicians 122 of locate service provider 110. Managers 114 may be high-level managers of locate service provider 110, including directors and/or company executives of locate service provider 110 that oversee QC approvers 116, approvers 118, QC technicians 120 and locate technicians 122. Managers 114 may interact with the ticket approval application 130 via a display device 156A and a user input device 158A coupled to the work management server 112. It is contemplated that managers 114, QC approvers 116, approvers 118, QC technicians 120 and other locate technicians 122 may also serve in a QC capacity according to the present disclosure.

QC approvers 116 may be the individuals that are responsible for processing any QC referrals and to whom QC technicians 120 may report. QC approvers 116 may interact with the ticket approval application 130 via a display device 156B and a user input device 158B coupled to the work management server 112. QC technicians 120 are technicians that are dispatched into the field for performing QC activities. Approvers 118 may be the direct supervisors of locate technicians 122. Approvers 118 may interact with the ticket approval application 130 via a display device 156C and a user input device 158C coupled to the work management server 112. Further, managers 114, QC approvers 116, and/or approvers 118 may be the personnel of the customers of locate service provider 110. For example, managers 114, QC approvers 116, and/or approvers 118 may be service managers of the customers of locate service provider 110 who wish to verify the quality of the workflow of locate service provider 110.

Referring again to FIG. 1, system 100 may include various image capture mechanisms 124 by which QC technicians 120 and locate technicians 122 provide images of the dig area while performing locate operations. In an example, image capture mechanism 124 is a consumer or professional grade digital still or video camera. In another example, image capture mechanism 124 is the device for providing an electronic manifest of underground facility locate marks that is described in U.S. patent application Ser. No. 12/029,732 (the "'732 patent application"), entitled "Electronic manifest of underground facility locate marks," that is incorporated by reference herein in its entirety.

Image capture mechanism 124 may be used to obtain an image used to verify the address of the locate operation, to verify the ticket information of the locate operation, and/or to provide proof that the locate operation was actually performed. For example, image capture mechanism 124 may be used to provide an image of something that identifies the location of the dig area, such as an image that shows the street number on a mailbox or on a building or a serial number on a telephone pole. In an exemplary embodiment, certain digital cameras and other devices have geographic or global positioning system (GPS) technology integrated therein, which allows GPS data (i.e., dig area data) to be stored with the image data. In this case, the GPS data may be used as the dig area identifier mechanism. In addition, image capture mechanism 124 may be used to provide an image of a manifest or similar log of the ticket, dig area and locate marks. Furthermore, image capture mechanism 124 may be used to provide an image of the dig area showing locate marks.

Dig area and image (dig area/image) data from image capture mechanisms 124 may be transmitted to and stored on, for example, an image server 126. Each image from image capture mechanisms 124 is associated with a certain ticket. Image server 126 is connected to the work management server 112 via a wired or wireless network 128. Network 128 is, for example, a wide area network (WAN), a local area network (LAN), a telephone network, such as the Public Switched Telephone Network (PSTN) or a cellular network, an Internet connection, an Intranet connection, one or more communication links, and/or a combination of networks. Also, dig area/image data from image capture mechanism 124 may be transmitted directly to work management server 112, as shown by communication link 160.

As noted above, work management server 112 includes a ticket approval application 130 that is implemented via processor-executable instructions executed by processing unit 150 and a database 132 stored in memory 152. Database 132, created and maintained by any suitable database software, stores relationships between, for example, dig area/image data captured by image capture mechanism 124, tickets 134, locate technicians 122 and approvers 118. For example, database 132 may store tickets 134 and associated dig area/image data 136.

In an embodiment, ticket approval application 130 is a software application that provides a graphical computerized mechanism for performing oversight and quality control in a locate operation. Additional details relating to an example of a method implemented by the ticket approval application 130 in an oversight and quality control operation are described with reference to FIG. 2. Further, additional details of example GUIs of ticket approval application 130 that may be displayed on one or more of display devices 156A, 156B and 156C are described with reference to FIGS. 3 through 11.

The features of ticket approval application 130 of system 100 of the present disclosure may include, but are not limited to, the following:

a mechanism by which approvers may review tickets rapidly in real time and/or within a certain amount of time (e.g., within one day) from the ticket being executed;

a mechanism by which dig area/image data that is associated with approved tickets may be stored with the appropriate ticket(s) as a part of the archival process;

a mechanism by which a numerical count of approved tickets, coaching referrals, and QC referrals, may be maintained for different levels of the system;

a mechanism by which, while QC approvers 116 may be required to review all tickets of all locate technicians 122 under their supervision, a random and/or rules-based subset of tickets may be selected for higher managerial review, which adds a further level of quality assurance;

a mechanism by which tickets that are tagged for QC referral may be dispatched immediately to the original locate technician, QC technician, and/or another locate technician;

a mechanism by which substantially all tasks that are associated with a QC referral may be completed the same day as dispatched and the manifest is revised to reflect any changes that are made on site;

a mechanism by which QC referrals that are not completed on the same business day as referred may be flagged for managerial review and handling;

a mechanism by which approvers 118 may log and track coaching referrals;

a mechanism by which received data is interrogated against various aspects and limitations, such as time to complete work, cost to complete work, conditions at the work site, time the work was performed (proper or improper time), efficiency with which the work was performed, and the like, to provide exception notifications relating to certain reviewed tickets that can be flagged for review by approver 118;

a mechanism by which coaching opportunities that are not completed within a certain amount of time, for example, within ten business days, may be flagged for managerial review and handling; and a mechanism by which substantially all documentation may be auto-archived, for example, in database 132 of work management server 112 as well as in employee personnel files (e.g., human resources files) for use, for example, with tracking employee information and performance evaluation scoring.

Figure 2:
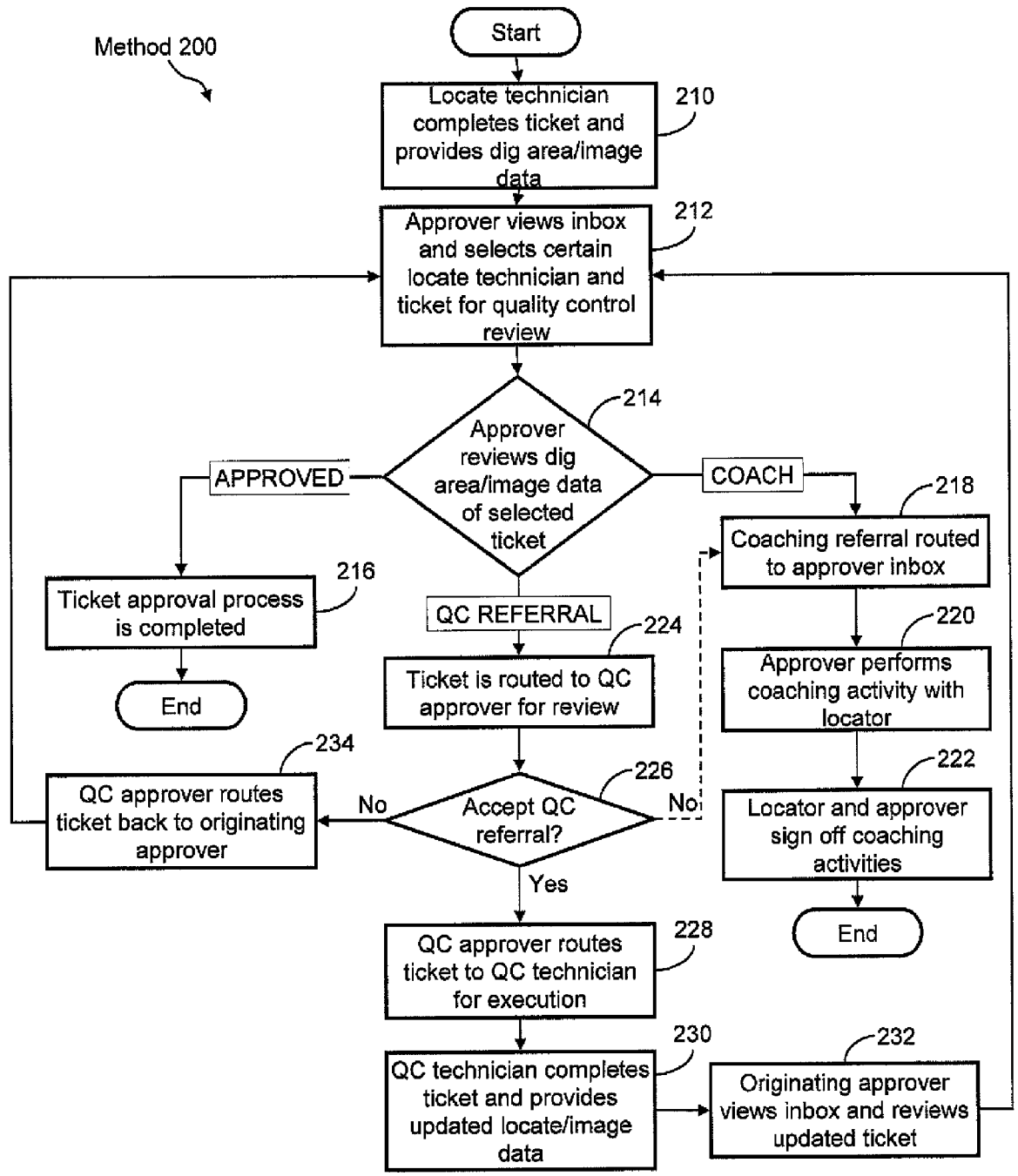
FIG. 2 illustrates a flow diagram of an example of a method of performing oversight and quality control using the ticket approval system, in accordance with the present disclosure.

Turning now to FIG. 2, a flow diagram of an example of a method 200 of performing oversight and quality control in a locate operation using system 100 is presented. Method 200 may include, but is not limited to, the following steps, which may be implemented in any order.

At step 210, the locate technician completes the ticket and provides dig area data. For example, locate technician 122 is assigned a certain ticket and is dispatched to a specific dig area to perform a locate operation. In the process of performing the locate operation, locate technician 122 captures the required dig area/image data via image capture mechanism 124. In an example, when image capture mechanism 124 is a digital camera, locate technician 122 provides a digital photograph that shows the street number on a building, another digital photograph of the paper manifest, and another digital photograph of the dig area, showing locate marks. Additionally, when image capture mechanism 124 is the device and method of the '732 patent application, the images of the dig area, showing locate marks, are in the form of an image of the dig area that has locate marks electronically overlaid thereon. These locate marks denote the presence of facilities. The device and method of the '732 patent application provide alternative mechanisms for automatically providing dig area identification information and manifest information in electronic form for importing into ticket approval application 130.

Upon completion of the locate operation, the dig area/image data of image capture mechanism 124 may be transmitted to image server 126 or directly to work management server 112. In doing so, the dig area/image data is accessible to ticket approval application 130. Additionally, an association is formed between the dig area/image data and the ticket. This association between the dig area/image data and the ticket is maintained throughout the steps of the oversight and quality control method of the present disclosure.

At step 212, an approver opens the ticket approval application 130 and selects a certain locate technician and ticket for quality control review. Each approver 118 is responsible for a certain group of locate technicians 122. This approver-specific group of locate technicians 122 may be called an approver group.

By way of example, FIG. 3 illustrates an example of an approver inbox GUI 300 for use in system 100 of the present disclosure. Approver inbox GUI 300 may be the user interface that is presented to approver 118 upon logging into ticket approval application 130. Approver inbox GUI 300 displays one or more locate technician windows 310 (310a-310i), whereby each of locate technician windows 310 is associated with certain locate technician 122 of the approver group. A display area of approver inbox GUI 300 may indicate the total number of new tickets, coaching referrals and QC referrals for the approver group. Approver 118 is able to select a new ticket via a new ticket icon 312 and is able to select tickets that have been referred for QC via a quality controlled ticket icon 314. Further, approver 118 is able to select tickets that have been referred for coaching via a coached ticket icon 316. In an example, approver 118 selects new ticket icon 312 of locate technician window 310a. Ticket approval application 130 reads in the associated ticket information and dig area/image data from tickets 134 and dig area/image data 136 of database 132.

At step 214, approver 118 reviews the dig area/image data of the selected ticket. For example, approver 118 reviews the ticket of locate technician window 310a that was selected at step 212.

Figure 4:
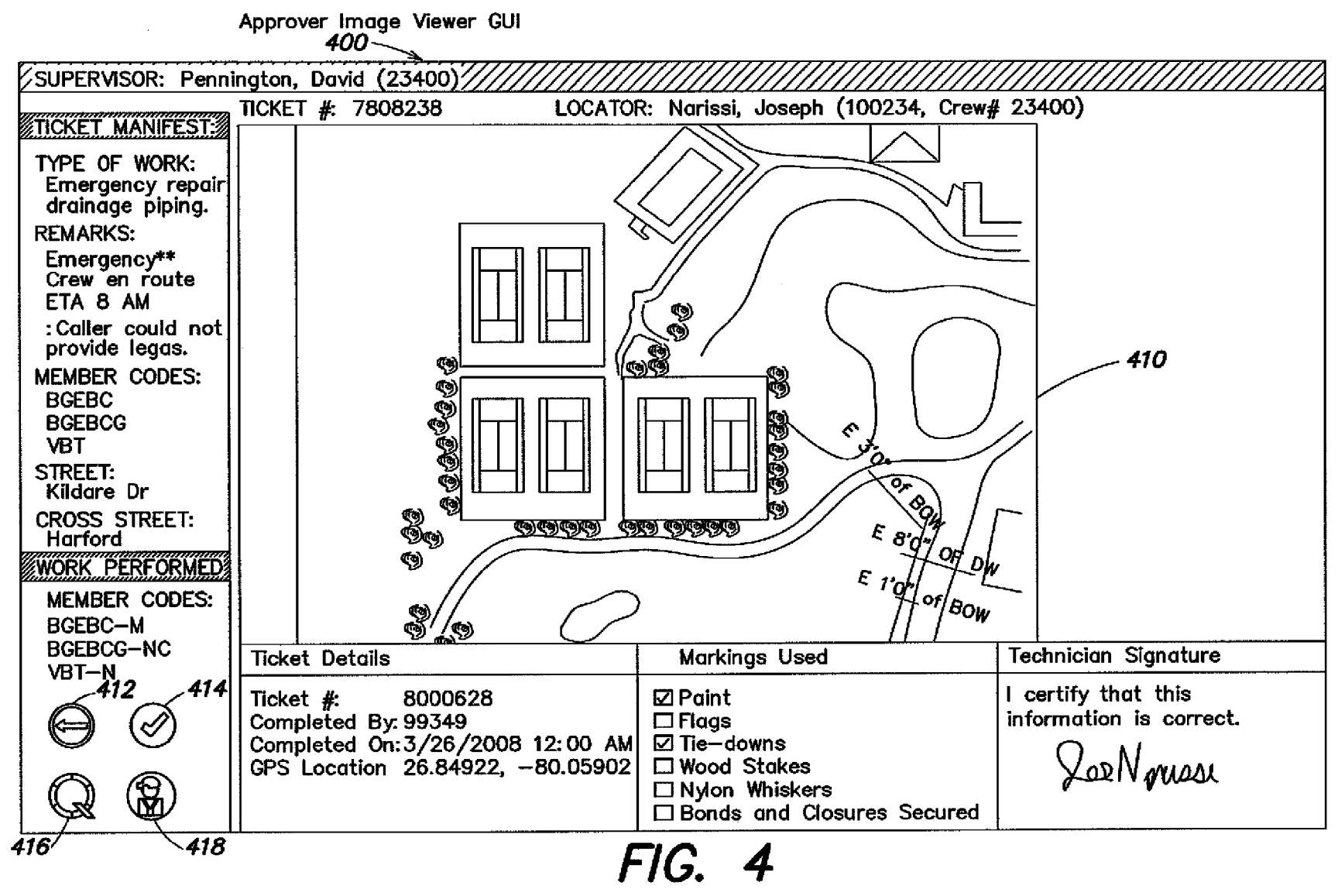

By way of example, FIG. 4 illustrates an approver image viewer GUI 400 for use in the ticket approval system of the present disclosure. Approver image viewer GUI 400 may include an image display area 410, multiple text display fields, such as a TICKET MANIFEST display field, and a WORK PERFORMED display field. Other information may be displayed, such as the ticket number, locate technician name, ticket details, locate marks used, and a locate technician signoff field. Additionally, approver 118 may select a navigate back icon 412 in order to return to a previous GUI, may select an approved icon 414 in order to categorize the ticket as satisfactory, may select a QC icon 416 in order to categorize the ticket as unsatisfactory and needing QC action, and may select a coach icon 418 in order to categorize the ticket as satisfactory, but locate technician is in need of coaching.

Approver 118 visually inspects the information that is displayed on approver image viewer GUI 400 and, in particular, compares the dig area image in image display area 410 with the information in the TICKET MANIFEST display field and a WORK PERFORMED display field.

If approver 118 determines that substantially all aspects of the locate operation are satisfactory, approver 118 selects approved icon 414 and method 200 proceeds to step 216. For example, if the information in the WORK PERFORMED display field and the markings that are shown at the dig area in image display area 410 satisfactorily match the information in the TICKET MANIFEST display field, approved icon 414 may be selected and method 200 proceeds to step 216. In this case, the risk of a locate error and damage to facilities during excavation is diminished.

If approver 118 determines that the locate operation itself is satisfactory, but certain aspects of the information that is provided by locate technician 122 needs improvement, approver 118 selects coach icon 418, which generates a coaching referral and method 200 proceeds to step 218. For example, the locate operation is satisfactory when the information in the WORK PERFORMED display field and the markings that are shown at the dig area in image display area 410 sufficiently match the information in the TICKET MANIFEST display field. In this case, risk of a locate error and damage to underground facilities during excavation may be low. However, certain details of the markings may need to improve. For example, a less than desirable anchor point has been marked. This may result in a minor inaccuracy, while not presenting a risk of damage during excavation. In this example, locate technician 122 may need training with regard to selecting anchor points.

If approver 118 determines that important aspects of the locate operation are unsatisfactory, approver 118 selects QC icon 416, which generates a QC referral and method 200 proceeds to step 224. In an example, a gross error that may prompt the need for QC action may be when the TICKET MANIFEST calls for gas, power, and water lines to be located and marked, yet the information in the WORK PERFORMED display field and site image in image display area 410 shows that only the gas and power lines were marked. In this example, because the water lines were not marked, there may be an increased risk of damage to the water lines during excavation, and immediate corrective action may be required.

Figure 5:
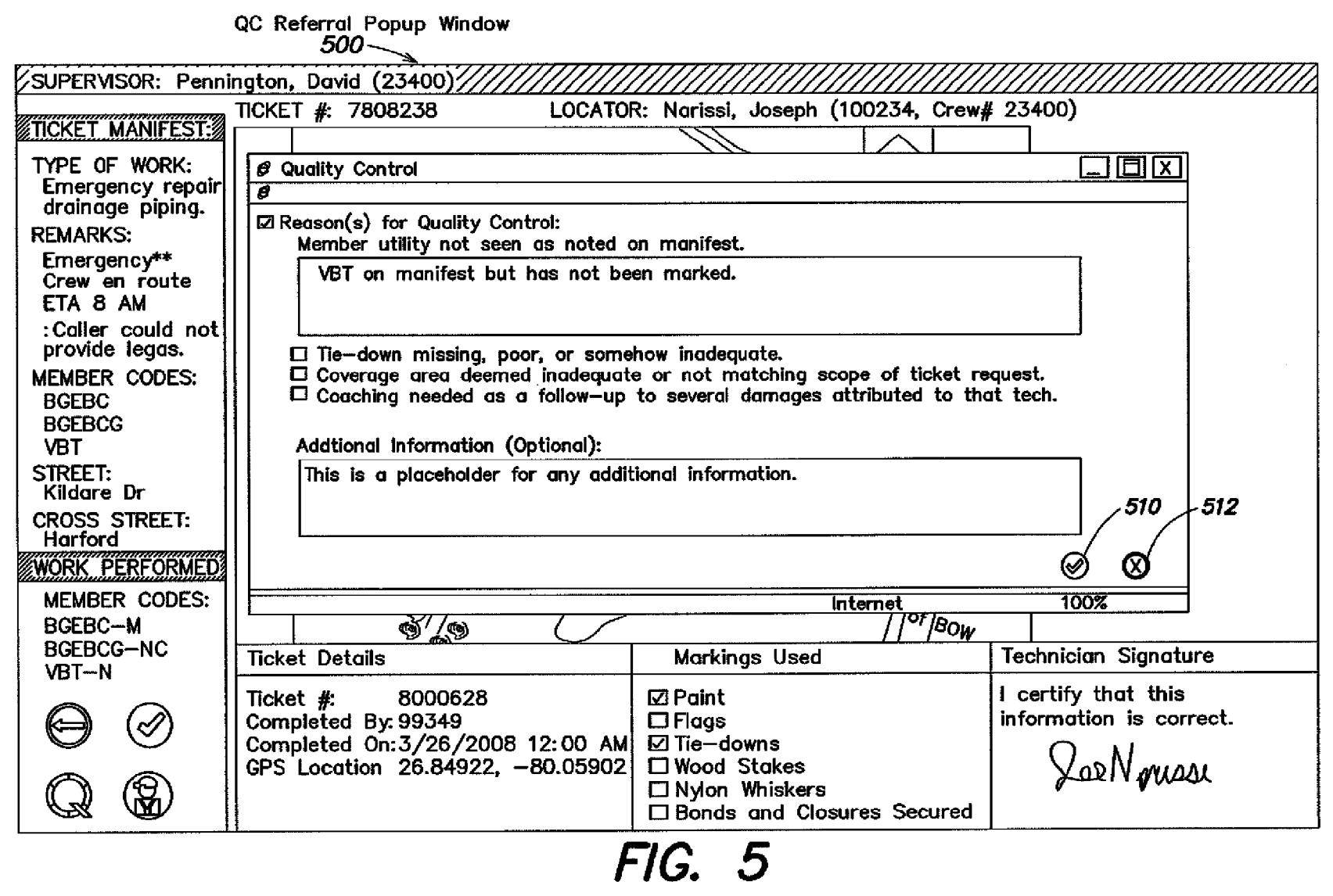

Further to the QC referral example, FIG. 5 illustrates an example of a QC referral popup window 500 for use in the ticket approval system of the present disclosure. QC referral popup window 500 shows a selection of various reasons for which a QC referral may be generated as well as a text box for entering notes. For the above example, QC referral popup window 500 shows that the reason for referral is "Member underground facility not seen as noted on manifest" and clarifying notes are shown. QC referral popup window 500 includes a submit QC referral icon 510 and a cancel QC referral icon 512. QC referral popup window 500 is not limited to the selections shown in FIG. 5 and may be designed to include any content.

Upon step 216, the ticket approval process is completed. The dig area/image data that is associated with approved tickets may be stored with the appropriate ticket(s) as a part of an archival process. The numerical count of approved tickets for the entire system, for each approver group of locate technicians 122 and for individual locate technician 122, may be updated and stored.

At step 218, the coaching referral is routed to the approver's inbox. For example, the coaching referral that is generated at step 214 may be maintained in the inbox of originating approver 118 for a certain period of time, such as, for example, ten business days. This allows for coaching schedules to be developed and completed in a timely manner.

At step 220, approver 118 performs the coaching activity with locate technician 122. For example, approver 118 steps through one or more coaching referrals in approver's 118 inbox for targeted locate technician 122 and performs one or more coaching activities, according to the contents of each coaching referral.

At step 222, locate technician 122 and approver 118 sign off on the coaching activities as acknowledgement that the coaching activity has been completed. A positive report of completing the coaching activities may be logged, for example, in the personnel file of locate technician 122. The one or more coaching referrals may then be removed from the inbox of approver 118.

At step 224, the ticket that is the subject of QC referral of step 214 is routed to a certain QC approver 116 for review. For example, certain QC approver 116 opens ticket approval application 130, views QC approver's inbox and selects a certain locate technician and ticket for which a QC review has been requested.

By way of example, FIG. 6 illustrates an example of a QC approver inbox GUI 600 for use in the ticket approval system of the present disclosure. QC approver inbox GUI 600 may be the user interface that is presented to certain QC approver 116 upon logging into ticket approval application 130. QC approver inbox GUI 600 (610a-610c) displays one or more locate technician windows 610, whereby each locate technician window 610 is associated with certain locate technician 122 and QC referral. A display area of QC approver inbox GUI 600 shows the total number of QC referrals. QC approver 116 is able to select any locate technician window 610, for example, QC approver 116 selects locate technician window 610a. Ticket approval application 130 reads in the associated ticket information and dig area/image data from tickets 134 and dig area/image data 136 of database 132.

Figure 7:
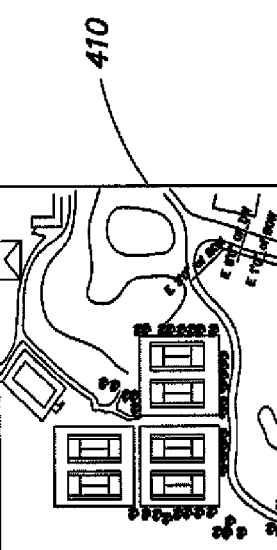
FIG. 7 illustrates an example of a QC approver image viewer GUI for use in the ticket approval system, in accordance with the present disclosure.

At decision step 226, QC approver 116 determines whether to accept or reject the QC referral. For example, QC approver 116 reviews the dig area/image data of the selected QC referral. By way of example, FIG. 7 illustrates a QC approver image viewer GUI 700 for use in the ticket approval system of the present disclosure.

QC approver image viewer GUI 700 may include image display area 410, the TICKET MANIFEST display field, the WORK PERFORMED display field, and other information, as described in approver image viewer GUI 400 of FIG. 4. Additionally, QC approver image viewer GUI 700 includes a navigate back icon 412, an approved icon 414, a QC icon 416 and a coach icon 418, as described in approver image viewer GUI 400 of FIG. 4. QC approver image viewer GUI 700 may also include a text field for displaying notes that were entered by originating approver 118 and additional selections and/or text fields for routing the QC request to original locate technician 122 or to certain QC technician 120.

QC approver 116 visually inspects the information that is displayed on QC approver image viewer GUI 700 and compares the dig area image in image display area 410 with the information in the TICKET MANIFEST display field and a WORK PERFORMED display field. QC approver 116 determines whether QC approver 116 is in agreement with originating approver 118 that the ticket requires QC action.

Figure 8:
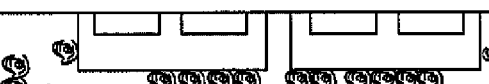
FIG. 8 illustrates an example of a reject QC popup window for use in the ticket approval system, in accordance with the present disclosure.

If QC approver 116 determines that QC action is needed, method 200 proceeds to step 228. If QC approver 116 determines that no QC action is needed, method 200 proceeds to step 234. FIG. 8 illustrates an example of a reject QC popup window 800 for use in system 100. Reject QC popup window 800 may include a text field for entering the reason for rejection as well as a submit QC rejection icon 810 and a cancel QC rejection icon 812.

Figure 9:
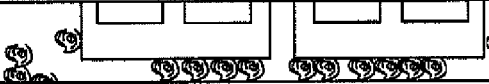
FIG. 9 illustrates an example of a coaching popup window for use in the ticket approval system, in accordance with the present disclosure.

Optionally, QC approver 116 may determine that no QC action is needed, but coaching is recommended. In this case, method 200 proceeds to step 218. FIG. 9 illustrates an example of a coaching popup window 900 for use in system 100. Coaching popup window 900 may include a text field for entering the reason for coaching as well as a submit coaching request icon 910 and a cancel coaching request icon 912.

At step 228, QC approver 116 routes the ticket to a QC technician for execution. For example, QC approver 116 makes note of the QC action that is needed via QC approver image viewer GUI 700. In the example of step 214, wherein the water lines should have been marked, but were not, QC approver 116 makes a note that the water lines were not marked. QC approver 116 then routes the QC request to original (or alternate) locate technician 122 or to certain QC technician 120 who returns to the dig area to perform the required tasks (e.g., to mark the water lines).

At step 230, QC technician 120 completes the ticket and provides updated dig area/image data. For example, revisiting the dig area in order to perform the tasks that are necessary to satisfy the QC referral. Upon completion of the QC operation, the dig area/image data of the image capture mechanism 124 is transmitted to image server 126 or directly to work management server 112. In doing so, the updated dig area/image data is accessible to ticket approval application 130.

Figure 10:
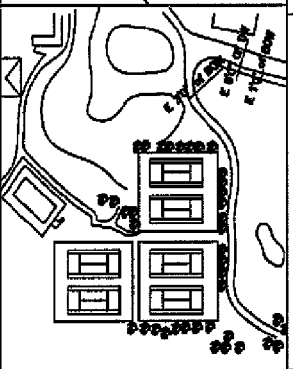
FIG. 10 illustrates another example of the approver image viewer GUI for use in the ticket approval system, in accordance with the present disclosure.

At step 232, approver 118 that originated the QC referral opens approver inbox GUI 300 and reviews the updated ticket via approver image viewer GUI 400. FIG. 10 illustrates another example of approver image viewer GUI 400 that includes additional information. For example, approver 118 is able to view additional notes that have been added along the entire history of the ticket by, for example, QC approver 116 who processed the QC referral and/or QC technician 120 who was assigned to perform the QC operation. Additionally, approver 118 is able to view the original dig area images supplied by original locate technician 122 as well as the new dig area images supplied by QC technician 120. Method 200 returns to step 212 where approver 118 may again review the updated ticket similar to any other ticket.

At step 234, certain QC approver 116 routes the ticket back to the originating approver 118. Method 200 returns to step 212 where approver 118 may again review the ticket similar to any other ticket.

Method 200 is not limited to the operations that are described in FIG. 2. Other operations may occur, such as tracking the status of QC referrals, flagging delinquent QC referrals, tracking the status of coaching referrals, flagging delinquent coaching referrals, tracking the total ticket numbers across the entire service provider, and dashboard reporting. For example, FIG. 11 illustrates an example of a ticket summary GUI 1100 for use in the ticket approval system of the present disclosure. At any time, manager 114 may view the current numerical count of approved tickets, coaching referrals and QC referrals. For example, the ticket summary GUI 1100 shows a summary of these counts, organized by approver groups.

In an alternative embodiment, an example of a real time (or substantially real time) method of performing oversight and quality control in locate operations using the ticket approval system of the present disclosure may be enabled by use of, for example, email infrastructure. In this embodiment, work management server 112 and, in particular, ticket approval application 130 may be accessible via an email application and there may be email communication between entities. Upon completion of a ticket, locate technician 122 may send an email to approver 118 that includes substantially the same content as shown in approver image viewer GUI 400. By use of an email application, approver 118 may process the ticket much the way that has been described in FIGS. 1 through 11, wherein the various GUIs are viewed and processed via the email application. In this embodiment, the workflow is being pushed from locate technicians 122 to approvers 118, rather than being pulled by approvers 118 from locate technicians 122. It is further contemplated that approver 118 will provide a signature, such as, an electronic signature or other indicator to signify completion of the review process.

Similarly, the use of additional communication devices such as mobile telephones, PDAs, portable computers (i.e., laptops and tablet PCs), text messaging and the like are contemplated within all aspects of the present disclosure. By use of one or more of the additional communication devices, any manager/approver/QC technician/locate technician (114, 116, 118 and 120) may process the tickets much the way that has been described in FIGS. 1 through 11, wherein the various GUIs are viewed and processed via any of the one or more additional communication instruments.

Further, it is contemplated that dig area and image data, tickets and related communications according to the present disclosure can be made through wireless interfaces including, for example, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), combinations thereof, and other types of wireless networking protocols. Additionally, the wireless interface may be capable of capturing signals that reflect a user's intent. For example, the wireless interface may include a microphone that can capture a user's intent by capturing the user's audible statements or commands. Alternatively, the wireless interface may interact with a device that monitors a condition or biological state of the user, such as eye movement, brain activity, heart rate, and/or other subtle signals.

While the ticket approval system and methods of FIGS. 1 through 11 have been described in the context of underground facility locate applications, this is only for exemplary purposes. The ticket approval system and method of the present disclosure may be applicable to any field service or distributed workforce application.

Furthermore, while the ticket approval system and methods of FIGS. 1 through 11 have been described in the context of oversight and quality control of locate operations, the system and methods of the present disclosure are not limited to locate operations involving underground facilities only. The system and methods of the present disclosure are suitable for performing quality control of locate operations, activities to detect or infer the presence or absence of above ground facilities, and any combination thereof. Additionally, the system and methods of the present disclosure can be used in other industries and practices such as, for example, used in the inspection practices of the building and construction fields.

No element, act, or instruction used in the present application should be construed as critical or essential to the present disclosure unless explicitly described as such. In addition, as used herein, the article "a" is intended to include one or more items. Where only one item is intended, the term "one" or similar language is used.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

The invention claimed is:

1. In a system comprising at least one processing unit, at least one memory, at least one communications interface, at least one display device, and at least one user interface device, a method for assessing a locate and marking operation performed by a first locate technician, the locate and marking operation comprising identifying a presence or an absence of at least one underground facility within a dig area by placing at least one physical locate mark in the dig area, wherein at least a portion of the dig area is to be excavated or disturbed during excavation activities, the method comprising:
 A) electronically receiving via the at least one communications interface a copy of a ticket as provided to the first locate technician prior to performing the locate and marking operation, the ticket including ticket information regarding the locate and marking operation to be performed;
 B) electronically receiving via the at least one communications interface a locate manifest regarding the locate and marking operation as performed by the first locate technician, the locate manifest including at least one digital image associated with the dig area, wherein the at least one digital image includes a marked-up image of a geographic area surrounding the dig area, the marked-up image including at least one digital representation of the at least one physical locate mark electronically overlaid thereon;
 C) electronically associating, via the at least one processing unit, the locate manifest received in B) with the ticket received in A);
 D) displaying on the at least one display device at least a portion of the locate manifest, at least some of the ticket information, and a plurality of icons representing different possible quality assessments of the locate and marking operation performed by the first locate technician, the plurality of icons including:
  an approved icon representing a satisfactory locate and marking operation performed by the first locate technician;
  a QC icon representing an unsatisfactory locate and marking operation performed by the first locate technician; and
  a coach icon representing that the first locate technician requires coaching;
 E) receiving a selection, via the at least one user interface, of one of the approved icon, the QC icon, and the coach icon so as to provide a quality assessment of the locate and marking operation performed by the first locate technician;
 F) generating, via the at least one processing unit, an electronic record of the quality assessment of the locate and marking operation performed by the first locate technician based on the selection received in E), the electronic record further comprising the ticket information and the associated locate manifest; and
 G) storing the electronic record in the at least one memory.

2. The method of claim 1, further comprising electronically maintaining a numerical count of satisfactory locate and marking operations, unsatisfactory locate and marking operations, and locate and marking operations requiring coaching based on E).

3. The method of claim 1, wherein D), E) and F) are completed within one day of the first locate technician performing the locate and marking operation.

4. The method of claim 1, wherein B) comprises electronically receiving the locate manifest via email.

5. The method of claim 1, wherein the ticket information comprises at least one of:
 a ticket number;
 an address or other location information regarding the dig area; and
 at least one member code identifying a facility owner of the at least one underground facility.

6. The method of claim 1, wherein the at least one digital image comprises GPS data associated with the dig area.

7. The method of claim 1, wherein the locate manifest further comprises at least one of:
 a time, date and/or duration of the locate and marking operation;
 a ticket number for the ticket associated with the locate manifest;
 an address or other location information regarding the dig area;
 at least one first identifier for a facility owner of the at least one underground facility;
 at least one second identifier relating to work performed during the locate and marking operation;
 a third identifier for a party requesting the locate and marking operation;
 a fourth identifier for the first locate technician performing the locate and marking operation;
 a signature of the first locate technician;
 a fifth identifier for a crew to which the first locate technician belongs;
 at least one sixth identifier for one or more types of locate markings used for the locate and marking operation; and
 one or more notes made by the first locate technician.

8. The method of claim 1, wherein:
 the displayed portion of the locate manifest comprises the at least one digital image and a work performed text display field; and the displayed ticket information includes a ticket manifest text display field.

9. The method of claim 8, wherein E) comprises receiving the selection based at least in part on a comparison of the at least one digital image with the ticket manifest text display field and the work performed text display field.

10. The method of claim 1, wherein E) comprises receiving the selection based at least in part on at least one of:
- a time required to complete the locate and marking operation;
- a time at which the locate and marking operation was performed;
- a cost of the locate and marking operation;
- one or more conditions associated with the dig area;
- a number of facilities to be located as indicated in the ticket information;
- a discrepancy between the facilities to be located as indicated in the ticket information, but not indicated as marked in the locate manifest; and
- an efficiency with which the first locate technician performed the locate and marking operation.

11. The method of claim 1, further comprising maintaining the electronic record of the quality assessment of the locate and marking operation in an employee personnel file for the first locate technician.

12. A computer-readable storage medium encoded with instructions that, when executed on at least one processing unit, perform a method for assessing a locate and marking operation performed by a first locate technician, the locate and marking operation comprising identifying a presence or an absence of at least one underground facility within a dig area by placing at least one physical locate mark in the dig area, wherein at least a portion of the dig area is to be excavated or disturbed during excavation activities, the method comprising:
- A) electronically receiving a copy of a ticket as provided to the first locate technician prior to performing the locate and marking operation, the ticket including ticket information regarding the locate and marking operation to be performed;
- B) electronically receiving a locate manifest regarding the locate and marking operation as performed by the first locate technician, the locate manifest including at least one digital image associated with the dig area, wherein the at least one digital image includes a marked-up image of a geographic area surrounding the dig area, the marked-up image including at least one digital representation of the at least one physical locate mark electronically overlaid thereon;
- C) electronically associating the locate manifest received in B) with the ticket received in A);
- D) displaying at least a portion of the locate manifest, at least some of the ticket information, and a plurality of icons representing different possible quality assessments of the locate and marking operation performed by the first locate technician, the plurality of icons including:
    - an approved icon representing a satisfactory locate and marking operation performed by the first locate technician;
    - a QC icon representing an unsatisfactory locate and marking operation performed by the first locate technician; and
    - a coach icon representing that the first locate technician requires coaching;
- E) receiving a selection of one of the approved icon, the QC icon, and the coach icon so as to provide a quality assessment of the locate and marking operation performed by the first locate technician;
- F) generating an electronic record of the quality assessment of the locate and marking operation performed by the first locate technician based on the selection received in E), the electronic record further comprising the ticket information and the associated locate manifest; and
- G) storing the electronic record.

13. The computer-readable medium of claim 12, wherein the method further comprises electronically maintaining a numerical count of satisfactory locate and marking operations, unsatisfactory locate and marking operations, and locate and marking operations requiring coaching based on E).

14. The computer-readable medium of claim 12, wherein B) comprises electronically receiving the locate manifest via email.

15. The computer-readable medium of claim 12, wherein the ticket information comprises at least one of:
- a ticket number;
- an address or other location information regarding the dig area; and
- at least one member code identifying a facility owner of the at least one underground facility.

16. The computer-readable medium of claim 12, wherein the at least one digital image comprises GPS data associated with the dig area.

17. The computer-readable medium of claim 12, wherein the locate manifest further comprises at least one of:
- a time, date and/or duration of the locate and marking operation;
- a ticket number for the ticket associated with the locate manifest;
- an address or other location information regarding the dig area;
- at least one first identifier for a facility owner of the at least one underground facility;
- at least one second identifier relating to work performed during the locate and marking operation;
- a third identifier for a party requesting the locate and marking operation;
- a fourth identifier for the first locate technician performing the locate and marking operation;
- a signature of the first locate technician;
- a fifth identifier for a crew to which the first locate technician belongs;
- at least one sixth identifier for one or more types of locate markings used for the locate and marking operation; and
- one or more notes made by the first locate technician.

18. The computer-readable medium of claim 12, wherein:
the displayed portion of the locate manifest comprises the at least one digital image and a work performed text display field; and
the displayed ticket information includes a ticket manifest text display field.

19. The computer-readable medium of claim 12, wherein the method further comprises maintaining the electronic record of the quality assessment of the locate and marking operation in an employee personnel file for the first locate technician.

20. An apparatus for assessing a locate and marking operation performed by a first locate technician, the locate and marking operation comprising identifying a presence or an absence of at least one underground facility within a dig area by placing at least one physical locate mark in the dig area, wherein at least a portion of the dig area is to be excavated or disturbed during excavation activities, the apparatus comprising:

a communication interface;
at least one display device;
at least one user input device;
a memory to store processor-executable instructions; and
a processing unit coupled to the communication interface, the at least one display device, the at least one user input device, and the memory, wherein upon execution of the processor-executable instructions by the processing unit, the processing unit:

A) controls the communication interface to electronically receive a copy of a ticket as provided to the first locate technician prior to performing the locate and marking operation, the ticket including ticket information regarding the locate and marking operation to be performed by the first locate technician;

B) controls the communication interface to electronically receive a locate manifest regarding the locate and marking operation as performed by the first locate technician, the locate manifest including at least one digital image associated with the dig area, wherein the at least one digital image includes a marked-up image of a geographic area surrounding the dig area, the marked-up image including at least one digital representation of the at least one physical locate mark electronically overlaid thereon;

C) electronically associates the locate manifest received in B) with the ticket received in A);

D) controls the at least one display device to display at least a portion of the locate manifest, at least some of the ticket information, and a plurality of icons representing different possible quality assessments of the locate and marking operation performed by the first locate technician, the plurality of icons including:

an approved icon representing a satisfactory locate and marking operation performed by the first locate technician;

a QC icon representing an unsatisfactory locate and marking operation performed by the first locate technician; and a coach icon representing that the first locate technician requires coaching;

E) receives, via the at least one user interface device, a selection of one of the approved icon, the QC icon, and the coach icon so as to provide a quality assessment of the locate and marking operation performed by the first locate technician;

F) generates an electronic record of the quality assessment of the locate and marking operation performed by the first locate technician based on the selection received in E), the electronic record further comprising the ticket information and the associated locate manifest; and G) controls the memory so as to store the electronic record.

21. The apparatus of claim 20, wherein the processing unit further electronically maintains a numerical count of satisfactory locate and marking operations, unsatisfactory locate and marking operations, and locate and marking operations requiring coaching based on E).

22. The apparatus of claim 20, wherein D), E), and F) are completed by the processing unit within one day of the first locate technician performing the locate and marking operation.

23. The apparatus of claim 20, wherein the processing unit electronically receives the locate manifest via email.

24. The apparatus of claim 20, wherein the ticket information comprises at least one of:
a ticket number;
an address or other location information regarding the dig area; and
at least one member code identifying a facility owner of the at least one underground facility.

25. The apparatus of claim 20, wherein the at least one digital image comprises GPS data associated with the dig area.

26. The apparatus of claim 20, wherein the locate manifest further comprises at least one of:
a time, date and/or duration of the locate and marking operation;
a ticket number for the ticket associated with the locate manifest;
an address or other location information regarding the dig area;
at least one first identifier for a facility owner of the at least one underground facility;
at least one second identifier relating to work performed during the locate and marking operation;
a third identifier for a party requesting the locate and marking operation;
a fourth identifier for the first locate technician performing the locate and marking operation;
a signature of the first locate technician;
a fifth identifier for a crew to which the first locate technician belongs;
at least one sixth identifier for one or more types of locate markings used for the locate and marking operation; and
one or more notes made by the first locate technician.

27. The apparatus of claim 20, wherein:
the displayed portion of the locate manifest comprises the at least one digital image and a work performed text display field; and
the displayed ticket information includes a ticket manifest text display field.

28. The apparatus of claim 27, wherein the processing unit receives the selection based at least in part on a comparison of the at least one digital image with the ticket manifest text display field and the work performed text display field.

29. The apparatus of claim 20, wherein the processing unit receives the selection based at least in part on at least one of:
a time required to complete the locate and marking operation;
a time at which the locate and marking operation was performed;
a cost of the locate and marking operation;
one or more conditions associated with the dig area;
a number of facilities to be located as indicated in the ticket information;
a discrepancy between the facilities to be located as indicated in the ticket information, but not indicated as marked in the locate manifest; and
an efficiency with which the first locate technician performed the locate and marking operation.

30. The apparatus of claim 20, wherein the processing unit further maintains the electronic record of the quality assessment of the locate and marking operation in an employee personnel file for the first locate technician.

* * * * *